US012574586B2

(12) United States Patent
Buhmann et al.

(10) Patent No.: US 12,574,586 B2
(45) Date of Patent: Mar. 10, 2026

(54) AUTOMATED MOTION FEATURE-BASED VIDEO SYNCHRONIZATION

(71) Applicant: Disney Enterprises, Inc., Burbank, CA (US)

(72) Inventors: Jakob Joachim Buhmann, Zürich (CH); Martin Guay, Unterengstringen (CH); Mattia Gustavo Bruno Paolo Ryffel, Bidogno (CH); Dominik Tobias Borer, Greifensee (CH); Robert W. Sumner, Zürich (CH)

(73) Assignee: Disney Enterprises, Inc., Burbank, CA (US)

( * ) Notice: Subject to any disclaimer, the term of this patent is extended or adjusted under 35 U.S.C. 154(b) by 97 days.

(21) Appl. No.: 18/631,624

(22) Filed: Apr. 10, 2024

(65) Prior Publication Data

US 2025/0324126 A1     Oct. 16, 2025

(51) Int. Cl.
*H04N 21/43* (2011.01)
*G06T 7/246* (2017.01)

(52) U.S. Cl.
CPC ....... *H04N 21/43072* (2020.08); *G06T 7/246* (2017.01); *G06T 2207/10016* (2013.01)

(58) Field of Classification Search
CPC .......... G06T 7/246; G06T 2207/10016; H04N 21/43072
See application file for complete search history.

(56) References Cited

U.S. PATENT DOCUMENTS

| | | | | |
|---|---|---|---|---|
| 6,259,486 | B1 * | 7/2001 | Mahvi ...................... | H04N 5/44 348/730 |
| 6,287,199 | B1 * | 9/2001 | McKeown ......... | H04N 7/173 18 348/E7.071 |
| 7,120,880 | B1 * | 10/2006 | Dryer ..................... | G06Q 30/02 715/831 |
| 7,246,081 | B2 * | 7/2007 | Hill .................... | G06Q 30/0204 705/7.32 |
| 7,603,683 | B2 * | 10/2009 | Reto ........................ | H04N 7/15 709/204 |
| 7,730,507 | B2 * | 6/2010 | Sakai ....................... | H04N 5/63 348/730 |
| 7,814,509 | B2 * | 10/2010 | Kondo ............... | H04N 21/2143 725/12 |
| 7,889,073 | B2 * | 2/2011 | Zalewski ................ | G06F 3/012 340/500 |
| 8,190,907 | B2 * | 5/2012 | Tu ........................... | G06F 21/32 713/186 |

(Continued)

OTHER PUBLICATIONS

"The Next Generation of Motion Capture" Move Ai Ltd. 2024 7 Pgs.

*Primary Examiner* — Michael B. Pierorazio
(74) *Attorney, Agent, or Firm* — Farjami & Farjami LLP

(57) ABSTRACT

A system includes a hardware processor and a system memory storing software code. The hardware processor is configured to execute the software code to receive a plurality of video sequences each generated by a respective one of a plurality of cameras, each of the video sequences depicting a respective one of a plurality of three-dimensional (3D) movements of a subject from a different perspective, extract, from each of the video sequences, a respective set of two-dimensional (2D) motion features, to provide a plurality of 2D motion feature sets, and synchronize, using the 2D motion feature sets, the plurality of video sequences.

18 Claims, 4 Drawing Sheets

(56) References Cited

U.S. PATENT DOCUMENTS

| | | | | |
|---|---|---|---|---|
| 8,249,931 | B2* | 8/2012 | Giraud | G06V 40/165 |
| | | | | 705/14.5 |
| 8,504,843 | B2* | 8/2013 | Tu | A63F 13/212 |
| | | | | 713/186 |
| 8,689,250 | B2* | 4/2014 | Bhide | H04N 21/6582 |
| | | | | 725/40 |
| 8,712,110 | B2* | 4/2014 | Eckhoff | G06V 40/16 |
| | | | | 345/1.3 |
| 8,819,738 | B2* | 8/2014 | Gresta | H04N 21/816 |
| | | | | 725/61 |
| 9,785,247 | B1* | 10/2017 | Horowitz | G06V 40/113 |
| 10,217,281 | B2* | 2/2019 | Yu | G06T 7/251 |
| 12,394,072 | B1* | 8/2025 | Spiteri | A63B 69/002 |
| 12,412,299 | B2* | 9/2025 | Yamaguchi | G06T 7/73 |
| 2003/0063222 | A1* | 4/2003 | Creed | H04N 21/4508 |
| | | | | 348/E5.122 |
| 2005/0091680 | A1* | 4/2005 | Kondo | H04N 21/8146 |
| | | | | 725/12 |
| 2005/0262542 | A1* | 11/2005 | DeWeese | H04N 21/454 |
| | | | | 348/E7.071 |
| 2006/0143647 | A1* | 6/2006 | Bill | G06F 16/636 |
| | | | | 707/E17.101 |
| 2006/0177109 | A1* | 8/2006 | Storch | A63F 1/00 |
| | | | | 382/118 |
| 2007/0110298 | A1* | 5/2007 | Graepel | G06V 40/28 |
| | | | | 345/619 |
| 2007/0150916 | A1* | 6/2007 | Begole | H04N 21/42201 |
| | | | | 382/116 |
| 2007/0152994 | A1* | 7/2007 | Koh | G09G 5/006 |
| | | | | 348/E5.127 |
| 2007/0203911 | A1* | 8/2007 | Chiu | G06F 16/78 |
| 2008/0169930 | A1* | 7/2008 | Mallinson | G06Q 30/02 |
| | | | | 340/573.1 |
| 2009/0158309 | A1* | 6/2009 | Moon | G06V 20/53 |
| | | | | 725/12 |
| 2009/0158374 | A1* | 6/2009 | Malaure | H04L 67/10 |
| | | | | 725/114 |
| 2009/0164917 | A1* | 6/2009 | Kelly | G06F 3/011 |
| | | | | 715/757 |
| 2009/0195392 | A1* | 8/2009 | Zalewski | G06F 3/017 |
| | | | | 340/573.1 |
| 2010/0008547 | A1* | 1/2010 | Yagnik | G06F 18/28 |
| | | | | 382/118 |
| 2010/0075749 | A1* | 3/2010 | Seshadri | A63F 13/73 |
| | | | | 463/30 |
| 2010/0299210 | A1* | 11/2010 | Giraud | G06V 40/165 |
| | | | | 705/14.66 |
| 2010/0304853 | A1* | 12/2010 | Kukita | G07F 17/3227 |
| | | | | 463/30 |
| 2011/0018875 | A1* | 1/2011 | Arahari | G06T 15/04 |
| | | | | 345/420 |
| 2011/0065490 | A1* | 3/2011 | Lutnick | G07F 17/3223 |
| | | | | 463/16 |
| 2011/0275432 | A1* | 11/2011 | Lutnick | G07F 17/3244 |
| | | | | 463/25 |
| 2012/0059845 | A1* | 3/2012 | Covell | H04N 21/4394 |
| | | | | 707/769 |
| 2012/0135799 | A1* | 5/2012 | Okada | G07F 17/3202 |
| | | | | 463/25 |
| 2012/0218266 | A1* | 8/2012 | Maeta | H04N 13/183 |
| | | | | 345/422 |
| 2012/0244939 | A1* | 9/2012 | Braun | A63F 13/213 |
| | | | | 463/31 |
| 2012/0262574 | A1* | 10/2012 | Park | G06F 3/00 |
| | | | | 348/143 |
| 2013/0111509 | A1* | 5/2013 | Guo | H04H 60/45 |
| | | | | 725/12 |
| 2013/0312041 | A1* | 11/2013 | Gresta | H04N 7/17318 |
| | | | | 725/116 |
| 2016/0307335 | A1* | 10/2016 | Perry | G06T 7/292 |
| 2017/0091529 | A1* | 3/2017 | Beeler | G06T 7/246 |
| 2020/0288050 | A1* | 9/2020 | Knoll | G06T 13/40 |
| 2021/0158590 | A1* | 5/2021 | Bradley | G06T 17/20 |
| 2021/0201502 | A1* | 7/2021 | Hsu | G06V 40/171 |
| 2022/0138967 | A1* | 5/2022 | Slocum | G06T 7/215 |
| | | | | 382/103 |
| 2022/0351391 | A1* | 11/2022 | Derakhshani | G06T 7/0002 |
| 2023/0186684 | A1* | 6/2023 | Qiu | G06V 10/762 |
| | | | | 382/103 |
| 2024/0123288 | A1* | 4/2024 | Barbalinardo | G06V 10/764 |
| 2024/0144573 | A1* | 5/2024 | Agrawal | G06T 15/00 |
| 2024/0256030 | A1* | 8/2024 | Dahl | G06F 3/012 |
| 2024/0428456 | A1* | 12/2024 | Manzur | G06T 7/75 |
| 2025/0173891 | A1* | 5/2025 | Manzur | G06T 7/70 |

* cited by examiner

Hardware Processor          104

System Memory 106

Software Code 110

ML Model(s) 112

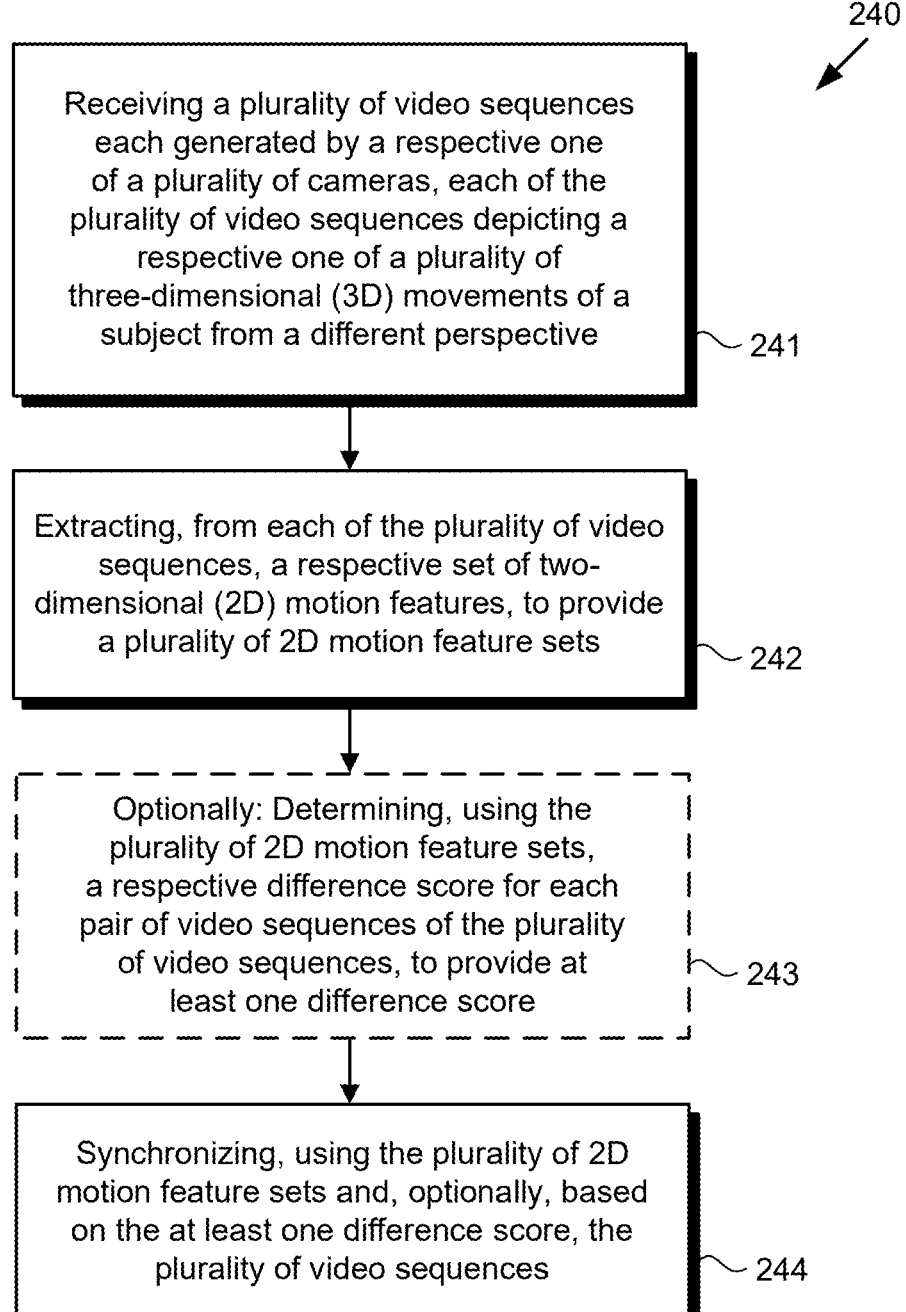

Receiving a plurality of video sequences each generated by a respective one of a plurality of cameras, each of the plurality of video sequences depicting a respective one of a plurality of three-dimensional (3D) movements of a subject from a different perspective

241

Extracting, from each of the plurality of video sequences, a respective set of two-dimensional (2D) motion features, to provide a plurality of 2D motion feature sets

242

Optionally: Determining, using the plurality of 2D motion feature sets, a respective difference score for each pair of video sequences of the plurality of video sequences, to provide at least one difference score

243

Synchronizing, using the plurality of 2D motion feature sets and, optionally, based on the at least one difference score, the plurality of video sequences

244

1. Neck
2. Right Shoulder
3. Right Elbow
4. Right Wrist
5. Left Shoulder
6. Left Elbow
7. Left Wrist
8. Right Hip
9. Right Knee
10. Right Ankle
11. Left Hip
12. Left Knee
13. Left Ankle

AUTOMATED MOTION FEATURE-BASED VIDEO SYNCHRONIZATION

BACKGROUND

In applications in which multiple video cameras are used to record an event, it is often necessary to synchronize the videos in order to sensibly merge the different perspective each camera captures. For example, different smartphone camera videos of the same event, such as a sporting event, a concert, a show, a parade, or an emergency situation for example, may be recorded by different witnesses to the event. Moreover, such "witness videos" are often initiated, terminated, or both, at different times by the respective attendees or witnesses.

Conventional approaches to merging videos typically require that those videos already be synchronized, rely on manual synchronization techniques, or require the use of expensive synchronized cameras. These conventional approaches rely on features or technologies that are often not germane to the underlying event that is the subject of the videography, and thereby undesirably introduce the use of unnecessary and extraneous elements. Consequently, there is a need in the art for a solution enabling the automated synchronization of videos based solely on movements by the subjects depicted in those videos.

BRIEF DESCRIPTION OF THE DRAWINGS

FIG. 1 shows an exemplary system for performing automated motion feature-based video synchronization, according to one implementation;

FIG. 2 shows a flowchart presenting an exemplary method for performing automated motion feature-based video synchronization, according to one implementation;

DETAILED DESCRIPTION

Figure 3:
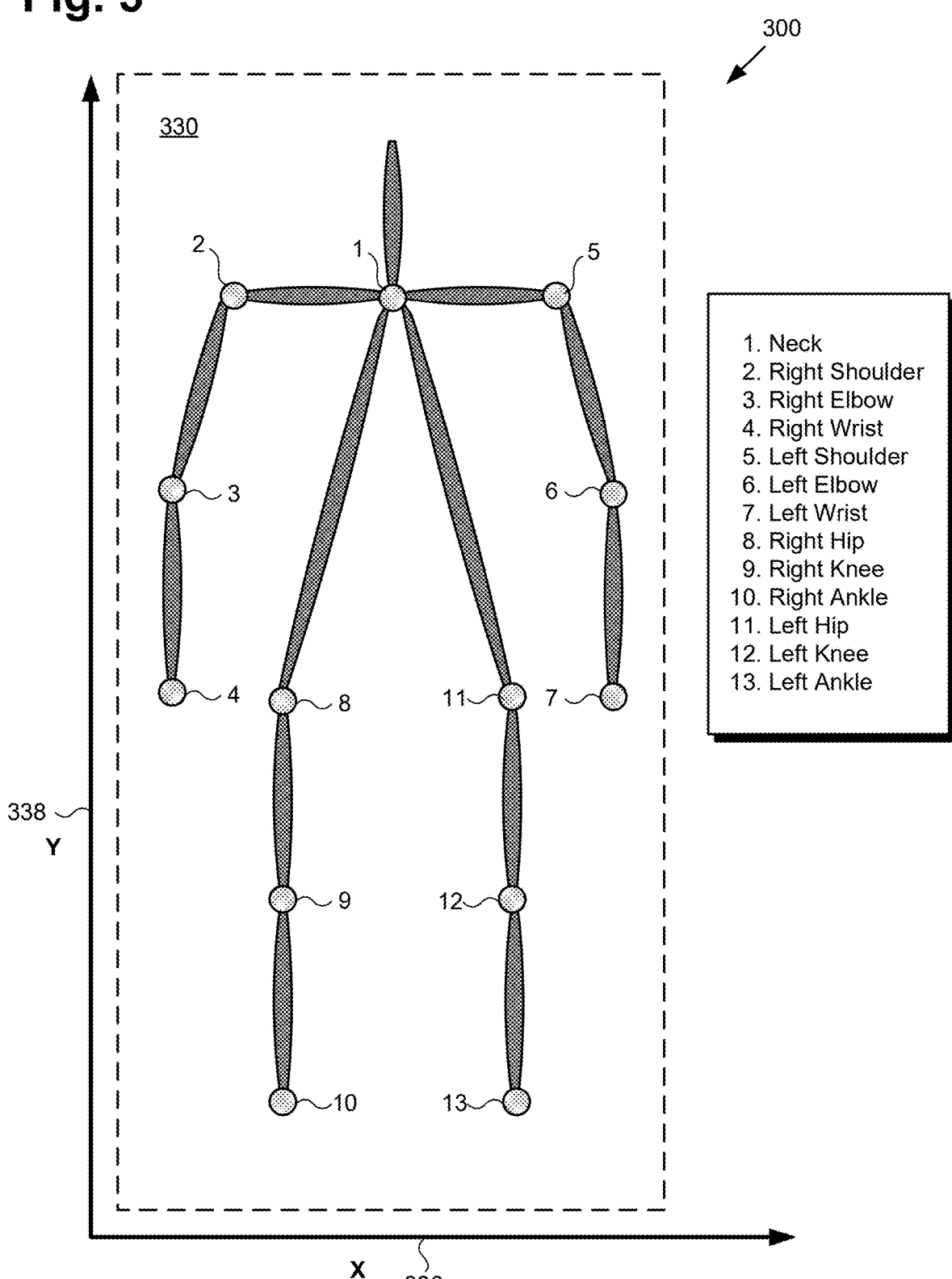
FIG. 3 shows an exemplary image plane based two-dimensional (2D) diagram of a skeleton having a plurality of joints, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, in applications in which multiple video cameras are used to record an event, it is often necessary to synchronize the videos in order to sensibly merge the different perspective each camera captures. For example, different smartphone camera videos of the same event, such as a sporting event, a concert, a show, a parade, or an emergency situation for example, may be recorded by different witnesses to the event. Moreover, such "witness videos" are often initiated, terminated, or both, at different times by the respective attendees or witnesses.

Conventional approaches to merging videos typically require that those videos already be synchronized, rely on manual synchronization techniques, or require the use of expensive synchronized cameras. These conventional approaches rely on features or technologies that are often not germane to the underlying event that is the subject of the videography, and thereby undesirably introduce the use of unnecessary and extraneous elements.

The present application discloses systems and methods for performing automated motion feature-based video synchronization that address and overcome the drawbacks and deficiencies in the conventional art by advantageously enabling the synchronization of videos based solely on movements by the subjects depicted in those videos. That is to say, the solution disclosed in the present application advances the state-of-the-art by enabling the automated synchronization of a plurality of video sequences using motion features alone, without requiring the use of synchronized cameras or manual synchronization based on audio cues or image features. Thus, according to the present novel and inventive approach to automated motion feature-based video synchronization, the cameras producing the video sequences being synchronized need not be calibrated, and the 3D locations of those respective cameras may be unknown to the system performing the video synchronization.

It is noted that as used in the present application, the terms "automation," "automated" and "automating" refer to systems and processes that do not require the participation of a human system operator. Thus, the methods described in the present application may be performed under the control of the hardware processing components of the disclosed systems.

Figure 1:
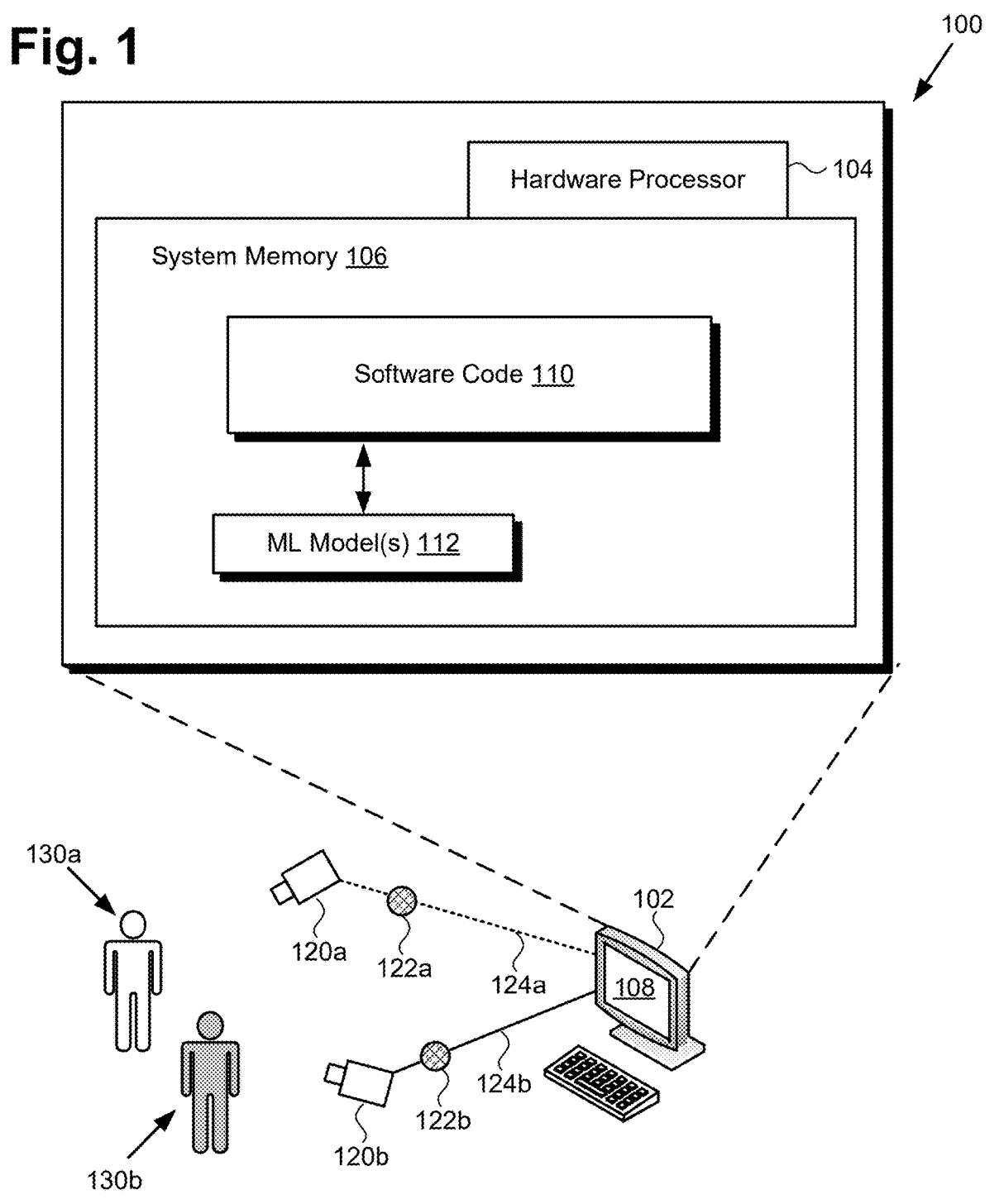

FIG. 1 shows exemplary system 100 for performing automated motion feature-based video synchronization, according to one implementation. As shown in FIG. 1, system 100 includes computing platform 102 having hardware processor 104, system memory 106 implemented as a non-transitory storage medium, and display 108. According to the present exemplary implementation, system memory 106 stores software code 110 and one or more trained machine learning (ML) models 112 (hereinafter "ML model(s) 112").

It is noted that, as defined in the present application, the expression "ML model" refers to a computational model for making predictions based on patterns learned from samples of data or "training data." Various learning algorithms can be used to map correlations between input data and output data. These correlations form the computational model that can be used to make future predictions on new input data. Such a predictive model may include one or more logistic regression models, Bayesian models, or artificial neural networks (NNs), large-language models, multimodal foundation models, as well as various classical artificial intelligence (AI) models, to name a few examples.

As further shown in FIG. 1, system 100 is implemented within a use environment including cameras 120*a* and 120*b* each communicatively coupled to computing platform 102, and one or more moving subjects 130*a* and 130*b*. In addition, FIG. 1 shows video sequences 122*a* and 122*b* generated by respective cameras 120*a* and 120*b*, and each depicting three-dimensional (3D) movements by one or more of subjects 130*a* and 130*b* from a different camera perspective. Also shown in FIG. 1 are wireless communication link 124*a* coupling camera 120*a* to computing platform 102 of system 100, and wired communication link 124*b* coupling camera 120*b* to computing platform 102.

It is noted that although subjects 130a and 130b are depicted as humanoid figures in FIG. 1, that representation is provided merely as an example. More generally one or more of subjects 130a and 130b may be or include a skeleton, such as a skeleton of a human being, animal, or a robot having articulated joints, for example. Alternatively, or in addition, in some use cases, one or more of subjects 130a and 130 may be a non-skeletal animate or inanimate object. Examples of an inanimate object may include a thrown ball, a projectile, or an autonomous or wirelessly controlled vehicle or toy, to name a few. It is further noted that although FIG. 1 depicts two subjects 130a and 130b, in various use cases, 3D movements by only one of subjects 130a or 130b may be tracked using cameras 120a and 120b, or the 3D movements of more than two subjects may be tracked using cameras 120a and 120b. In other words, in various implementations, subjects 130a and 130b may represent a single subject, two subjects, or more than two subjects.

It is also noted that, although FIG. 1 depicts two cameras 120a and 120b and two video sequences 122a and 122b, in other implementations more than two cameras may be communicatively coupled to computing platform 102 by wired or wireless communication links and may be used to generate more than two respective video sequences 122a and 122b. Thus, in various implementations, cameras 120a and 120b may represent two cameras, or more than two cameras. Accordingly, video sequences 122a and 122b may represent two video sequences, or more than two video sequences.

Cameras 120a and 120b may be digital video cameras, for example. In some implementations, cameras 120a and 120b may be configured to capture color or black and white monocular digital images. In one such implementation, cameras 120a and 120b may be red-green-blue (RGB) color video camera(s), for example. Alternatively, or in addition, cameras 120a and 120b may be depth cameras, such as RGB-D cameras. In other implementations, cameras 120a and 120b may be or include infrared (IR) cameras, or may correspond to any other suitable optical sensor(s) for obtaining video sequences 122a and 122b of one or more of subjects 130a and 130b. Moreover, in some implementations, one or both of cameras 120a and 120b may be a camera included as a feature of a personal communication device, such as a smartphone, for example.

Referring to system 100, system memory 106 may take the form of any computer-readable non-transitory storage medium. The expression "computer-readable non-transitory storage medium," as defined in the present application, refers to any medium, excluding a carrier wave or other transitory signal, that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Moreover, in some implementations, system 100 may utilize a decentralized secure digital ledger in addition to system memory 106. Examples of such decentralized secure digital ledgers may include a blockchain, hashgraph, directed acyclic graph (DAG), and Holochain® ledger, to name a few. In use cases in which the decentralized secure digital ledger is a blockchain ledger, it may be advantageous or desirable for the decentralized secure digital ledger to utilize a consensus mechanism having a proof-of-stake (PoS) protocol, rather than the more energy intensive proof-of-work (PoW) protocol.

Although FIG. 1 depicts software code 110 and ML model(s) 112 as being co-located in a single instance of system memory 106, that representation is merely provided as an aid to conceptual clarity. More generally, system 100 may include one or more computing platforms 102, such as computer servers for example, which may be co-located, or may form an interactively linked but distributed system, such as a cloud-based system, for instance. As a result, hardware processor 104 and system memory 106 may correspond to distributed processor and memory resources within system 100, while software code 110 and one or more of ML model(s) 112 may be stored remotely from one another on the distributed memory resources of system 100.

Hardware processor 104 may include a plurality of hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for AI applications such as ML modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. In addition, or alternatively, in some implementations, system 100 may utilize a local area broadcast method, such as User Datagram Protocol (UDP) or Bluetooth, for instance to communicate with one or more of cameras 120a-120d. Furthermore, in some implementations, system 100 may be implemented virtually, such as in a data center. For example, in some implementations, system 100 may be implemented in software, or as virtual machines. Moreover, in some implementations, system 100 may be configured to communicate via a high-speed network suitable for high performance computing (HPC), for example a 10 GigE network or an Infiniband network.

In other implementations, however, and as shown in FIG. 1, system 100 may take the form of a desktop computer, or alternatively a tablet computer, laptop computer, smartphone, or an augmented reality (AR) or virtual reality (VR) device, for example, providing display 108. Display 108 may take the form of a liquid crystal display (LCD), a light-emitting diode (LED) display, an organic light-emitting diode (OLED) display, a quantum dot (QD) display, or any other suitable display screen that performs a physical transformation of signals to light. Furthermore, display 108 may be physically integrated with computing platform 102 or may be communicatively coupled to but physically separate from computing platform 102. For example, where system 100 is implemented as a smartphone, laptop computer, tablet computer, or an AR or VR device, display 108 will typically be integrated with computing platform 102. By contrast, where system 100 is implemented as a desktop computer, display 108 may take the form of a monitor separate from computing platform 102 in the form of a computer tower. The functionality of system 100 including software code 110 and ML model(s) 112 will be further described by reference to FIG. 2.

By way of overview, the present automated solution for synchronizing video extracts and utilizes two-dimensional (2D) motion features of a plurality of predetermined keypoints of a moving subject. In the case of a single subject including a skeleton, for example, those motion features may include the velocities of a set of predetermined keypoints in the form of joints of the skeleton of the subject. In the case of an inanimate object lacking a skeleton, any predetermined points of interest, such as vertices, boundary points, or the centroid of the object, for example, may serve as keypoints. Because the motions from different camera perspectives can significantly change in the horizontal x-axis of the image plane, as discussed in greater detail below, the present approach focuses on the vertical y-axis components of the motion features in the image plane. Those vertical components of the motion features can be compared between different video sequences, and the frame index for which the difference between the motion features is minimized synchronizes the video sequences.

While the above described approach only relies on 2D motion features, 3D poses of the moving subject may also be used when available (e.g., with an ML model trained to predict a 3D pose from a single view 2D pose). When such 3D poses are available, those 3D poses may be used to compute the per-joint velocities in the body frame of the subject to factor out the respective positions of the cameras.

In case of multiple subjects each including a skeleton, the above described procedure is performed for each skeleton, once again restricting the 2D motion features to the vertical y-axis components. Those vertical components of the 2D motion features can be compared between different video sequences, and again the frame index for which the difference between the motion features is minimized synchronizes the video sequences. It is noted that, because an initial synchronization is not required, the present automated motion feature-based solution can advantageously be used to synchronize witness videos, as well as legacy video content previously recorded for another purpose.

FIG. 2 shows flowchart 240 presenting an exemplary method for performing automated motion feature-based video synchronization, according to one implementation. With respect to the method outlined in FIG. 2, it is noted that certain details and features have been left out of flowchart 240 in order not to obscure the discussion of the inventive features in the present application.

Referring to FIG. 2, with further reference to FIG. 1, flowchart 240 includes receiving video sequences 122*a* and 122*b* each generated respectively by cameras 120*a* and 120*b*, each of video sequences 122*a* and 122*b* depicting 3D movements of a subject (hereinafter "subject 130*a*") from a different perspective (action 241). In other words, cameras 120*a* and 120*b* are not co-located. Each of video sequences 122*a* and 122*b* includes a plurality of video frames each depicting 3D movement by subject 130*a*. It is noted that, in some implementations each of cameras 120*a* and 120*b* may have a respective 3D camera location that is unknown to system 100.

In some implementations, each of video sequences 122*a* and 122*b* may include a plurality of video frames each including 2D, or 2D and 3D tracking data of movements by subject 130*a* in a 3D space. As noted above, in some implementations, subject 130*a* may be or include a skeleton, such as a skeleton of a human being, animal, or robot having articulated joints, for example. Video sequences 122*a* and 122*b* may be received, in action 241, by software code 110, executed by hardware processor 104 of system 100.

Continuing to refer to FIG. 2 in combination with FIG. 1, flowchart 240 further includes extracting, from each of video sequences 122*a* and 122*b*, a respective set of 2D motion features, to provide a plurality of 2D motion feature sets (action 242). It is noted that each of the 2D motion features extracted from each of video sequences 122*a* and 122*b*, in action 242, may correspond respectively to one of a plurality of predetermined keypoints of subject 130*a*. As noted above, in some implementations, subject 130*a* may be or include a skeleton. In some of those implementations, the plurality of predetermined keypoints of subject 130*a* may be or include joints of the skeleton of subjects 130*a*. Moreover, each 2D motion feature set provided in action 242 may correspond respectively to a different one of video sequences 122*a* and 122*b*.

Referring for example to FIG. 3, FIG. 3 shows exemplary image plane based 2D diagram 300 of skeleton 330 having a plurality of joints identified by reference numbers 1 through 13, according to one implementation. It is noted that the image plane depicted in FIG. 3 is the plane defined by x-axis 336 and y-axis 338, where x-axis 336 identifies a horizontal direction on the image plane and y-axis 338 identifies a vertical direction perpendicular to the horizontal direction on the image plane. It is further noted that skeleton 330 corresponds in general to either or both of subjects 130*a* and 130*b* in FIG. 1. Consequently, skeleton 330 (hereinafter "subject 330") may share any of the characteristics attributed to subjects 130*a* and 130*b* by the present disclosure, and vice versa.

With respect to action 242, and referring to FIGS. 1 and 3 in combination, a particular 3D movement by subject 130*a*/330 may result in different 2D horizontally directed projections of that movement on the image plane defined by x-axis 336 and y-axis 338. For example, if cameras 120*a* and 120*b* were to be situated on the same side of subject 130*a*/330 with respect to x-axis 336 while subject 130*a*/330 moves, the respective horizontal image plane projections of that movement tracked by cameras 120*a* and 120*b* would share the same general direction on the image plane. Conversely, if cameras 120*a* and 120*b* were to be situated on opposite sides of subject 130*a*/330 with respect to x-axis 336 while subject 130*a*/330 moves, the respective horizontal image plane projections of the movements tracked by cameras 120*a* and 120*b* would be in opposite directions on the image plane.

Nevertheless, whether cameras 120*a* and 120*b* were to be situated on the same side or opposite sides of subject 130*a*/330 with respect to x-axis 336 while subject 130*a*/330 moves, the respective vertical image plane projections of that movement tracked by cameras 120*a* and 120*b* would be in the same direction on the image plane. Thus, in some implementations it may be advantageous or desirable to track movements by subject 130*a*/330 by tracking the vertical projections of the motion of each of the joints of subject 130*a*/330 in the image plane defined by x-axis 336 and y-axis 338, while disregarding the horizontal projections of such motions on the image plane for that particular purpose. However, and as noted below, the horizontal projections of the motion of the joints of subject 130a/330 in the image plane defined by x-axis 336 and y-axis 338 may be used when predicting the spatial ordering of cameras 120a and 120b when cameras 120a and 120b correspond to more than two cameras.

Thus, in some implementations, the plurality of 2D motion features extracted in action 242 may include only respective vertical velocities in an image plane of each video frame included in video sequences 122a and 122b, while in other implementations the plurality of 2D motion features extracted in action 242 may include horizontal as well as vertical velocity components in the image plane of each video frame included in video sequences 122a and 122b. That plurality of predicted 2D motion features may be extracted, in action 242, by software code 110, executed by hardware processor 104 of system 100. Moreover, in some implementations, those 2D motion features may be provided by software code 110 in action 242 using an ML model specifically trained to predict such 2D motion features and included among ML model(s) 112 of system 100.

It is noted that in implementations in which the video frames of video sequences 122a and 122b include 3D tracking data of movements by subject 130a, hardware processor 104 of system 100 may be further configured to execute software code 110 to provide motion features in the 3D space. In those implementations, the motion features could be computed in a character aligned forward coordinate system. Moreover, in those implementations, the 3D motion features could be provided by software code 110 using another ML model specifically trained to predict such 3D motion features and included among ML model(s) 112 of system 100.

As noted above, in implementations in which cameras 120a and 120b correspond to more than two cameras, the horizontal projections of the motion of the joints of subject 130a/330 in the image plane defined by x-axis 336 and y-axis 338 may be used when predicting the spatial ordering of the cameras. By way of example, for each camera pair of cameras 120a and 120b, the correlations along the horizontal x-directions may be computed for all 2D motion feature subset pairs for each frame. An aggregation of the correlation may then be performed in a max fashion between the 2D motion feature sets. At this stage the objective is not to obtain a consistent matching of 2D motion feature sets but simply to maximize the correlations at a per frame basis. The correlations may then be averaged over time. By doing the foregoing between all camera pairs, a sequence through cameras 120a and 120b that maximizes this horizontal x-feature-based correlation can be determined. Finding that sequence requires solving an optimization problem analogous to a traveling salesperson problem, which poses the question: "Given a list of cities and the distances between each pair of cities, what is the shortest possible route that visits each city exactly once and returns to the origin city?" The traveling salesperson problem has been extensively analyzed and can be solved using any one of several known algorithms. Because the horizontal x-direction correlates more for cameras with a smaller angle between them, the sequence of cameras 120a and 120b that maximizes the horizontal x-feature-based correlation reflects the spatial ordering of cameras 120a and 120b.

Predicting the spatial ordering of cameras 120a and 120b is applicable to use cases in which cameras 120a and 120b are stationary. However, in some use cases, one or more of cameras 120a and 120b may be in motion. In use cases in which one or more of cameras 120a and 120b is/are in motion, the same methodology for synchronizing video disclosed in the present application can be applied in a body centric frame. In 2D, for example, the motion features can be computed in a reference frame that is for instance attached to a root joint of a skeleton, such as a hip joint, or a bounding box. In 3D, the character aligned forward coordinate system alluded to above can be utilized, if the root motion is eliminated.

Continuing to refer to FIG. 2 in combination with FIG. 1, in some implementations flowchart 240 may further include determining, using the plurality of 2D motion feature sets provided in action 242, a respective difference score for each pair of video sequences included among plurality of video sequences 122a and 122b, to provide at least one difference score (action 243). It is noted that action 243 is optional and, in some implementations, may be omitted from the method outlined by flowchart 240. In implementations in which optional action 243 is not performed, the method outlined by flowchart 240 may proceed from action 242 directly to action 244 described below.

Figure 4:
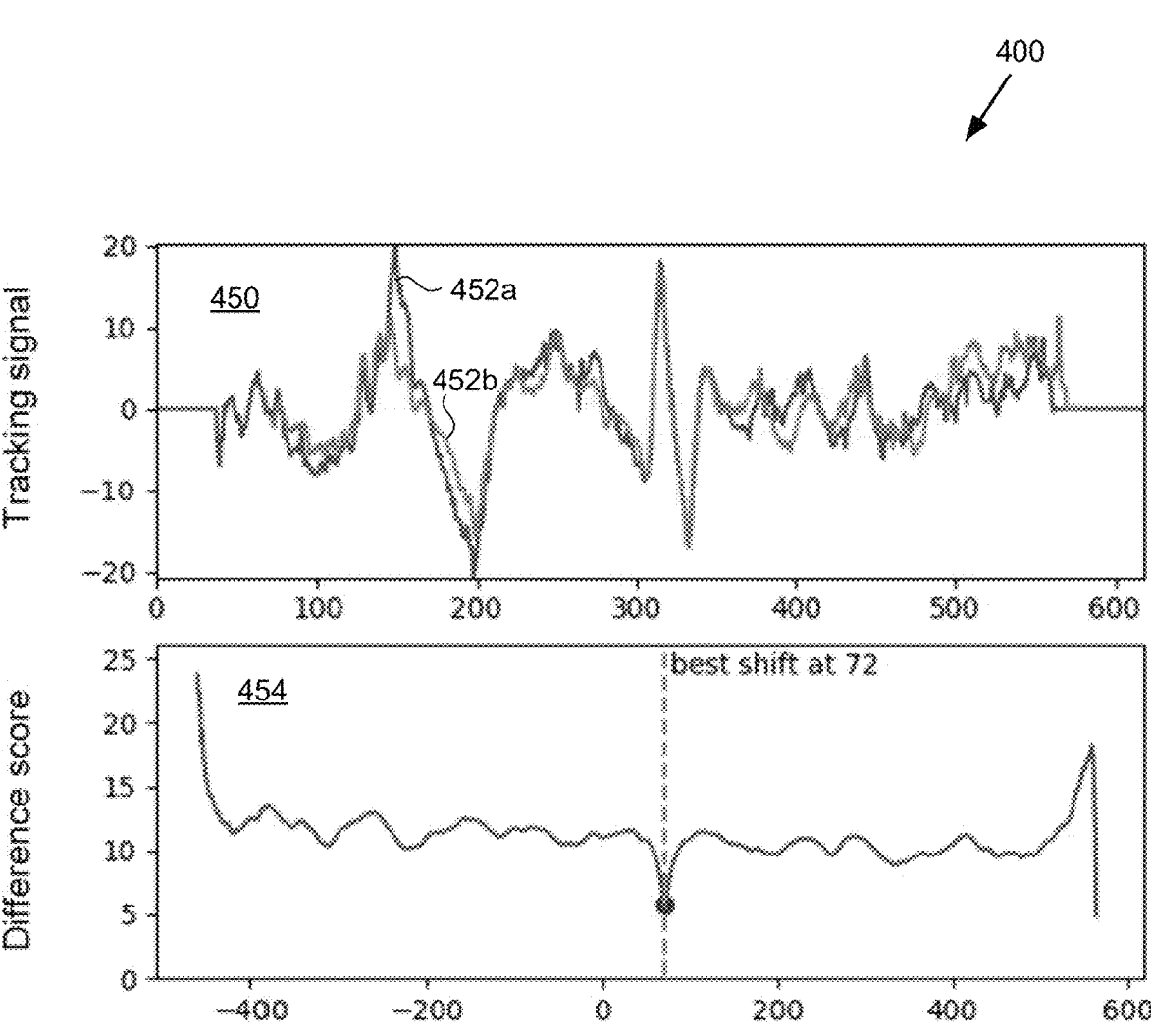
FIG. 4 shows a diagram depicting a process for performing automated motion feature-based video synchronization, according to one implementation.

Nevertheless, and referring to FIG. 4, FIG. 4 shows diagram 400 depicting a process for performing automated motion feature-based video synchronization, according to one implementation. It is noted that the exemplary process represented in FIG. 4 is for synchronization of two video sequences 122a and 122b generated by respective cameras 120a and 120b. Tracking signal traces 450 include trace 452a of the vertical y-axis 2D motion feature set of video sequence 122a, and trace 452b of the vertical y-axis 2D motion feature set of video sequence 122b. The differences between traces 452a and 452b for various shifted frame alignments is shown as difference score 454. That is to say, difference score 454 is determined by per-frame shifting trace 452b relative to trace 452a and computing the difference between traces 452a and 452b at each shift. The determination of the difference score for each pair of video sequences of video sequences 122a and 122b, in action 243, may be performed by software code 110, executed by hardware processor 104 of system 100.

Continuing to refer to FIG. 2 in combination with FIGS. 1 and 4, flowchart 240 further includes, synchronizing, using the plurality of 2D motion feature sets provided in action 242 and optionally based on the at least one difference score determined in action 243 (e.g., difference score 454), video sequences 122a and 122b (action 244). In some use cases, synchronization of video sequences 122a and 122b occurs where difference score 454 is at a minimum, i.e., a frame shift of 72 frames between video sequences 122a and 122b in the example depicted by FIG. 4. Thus, synchronizing video sequences 122a and 122b frame aligns those video sequences and thereby minimizes difference score 454. Synchronization of video sequences 122a and 122b, in action 244, may be performed by software code 110, executed by hardware processor 104 of system 100.

It is noted that other 2D motion feature-based metrics may be used to synchronize video sequences 122a and 122b in action 244. For example, in implementations in which optional action 243 is omitted and there is no difference score for which to find a minimum, the correlation of corresponding 2D motion features among the plurality of 2D motion feature sets provided in action 242 may be maximized, for example, by minimizing the L2 losses between those 2D motion feature sets. With respect to the method outlined by flowchart 240, it is emphasized that actions 241, 242, 243 and 244 may be performed in an automated process from which human involvement may be omitted.

Thus, the present application discloses systems and methods for performing automated motion feature-based video synchronization that address and overcome the drawbacks and deficiencies in the conventional art by advantageously enabling the synchronization of videos based solely on movements by the subjects depicted in those videos. The solution disclosed in the present application advances the state-of-the-art by enabling the automated synchronization of a plurality of video sequences using motion features alone, without requiring the use of synchronized cameras or manual synchronization based on audio cues or image features. Thus, according to the present novel and inventive approach to automated motion feature-based video synchronization, the cameras producing the video sequences being synchronized need not be calibrated, and the 3D locations of those respective cameras may be unknown to the system performing the video synchronization. Moreover, because an initial synchronization is not required, the present automated motion feature-based solution can be used on witness videos, as well as legacy video content previously recorded for another purpose.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:
1. A system comprising:
a hardware processor; and
a memory storing a software code;
the hardware processor configured to execute the software code to:
receive a plurality of video sequences each generated by a respective one of a plurality of cameras, each of the plurality of video sequences depicting a respective one of a plurality of three-dimensional (3D) movements of a subject from a different perspective;
extract, from each of the plurality of video sequences, a respective set of two-dimensional (2D) motion features to provide a plurality of 2D motion feature sets;
determine, using the plurality of 2D motion feature sets, a difference score for each pair of video sequences of the plurality of video sequences; and
synchronize, using the plurality of 2D motion feature sets, the plurality of video sequences by minimizing the difference score.
2. The system of claim 1, wherein synchronizing the plurality of video sequences frame aligns the plurality of video sequences.
3. The system of claim 1, further comprising a trained machine learning (ML) model, and wherein the plurality of 2D motion feature sets are provided using the trained ML model.

4. The system of claim 1, wherein the plurality of 2D motion features include only respective vertical velocities in an image plane of each video frame included in the plurality of video sequences.
5. The system of claim 1, wherein each 2D motion feature corresponds respectively to one of a plurality of predetermined keypoints of the subject.
6. The system of claim 1, wherein the subject includes a skeleton.
7. The system of claim 6, wherein each 2D motion feature corresponds respectively to one of a plurality of predetermined keypoints of the subject, and the plurality of predetermined keypoints of the subject comprise joints of the skeleton.
8. The system of claim 1, wherein a location of each of the plurality of cameras is a 3D location.
9. The system of claim 8, wherein the 3D location of each of the plurality of cameras is unknown to the system.
10. A method for use by a system including a hardware processor and a memory storing a software code, the method comprising:
receiving, by the software code executed by the hardware processor, a plurality of video sequences each generated by a respective one of a plurality of cameras, each of the plurality of video sequences depicting a respective one of a plurality of three-dimensional (3D) movements of a subject from a different perspective;
extracting, from each of the plurality of video sequences, by the software code executed by the hardware processor, a respective set of two-dimensional (2D) motion features, to provide a plurality of 2D motion feature sets;
determining, by the software code executed by the hardware processor and using the plurality of 2D motion feature sets, a difference score for each pair of video sequences of the plurality of video sequences; and
synchronizing, by the software code executed by the hardware and using the plurality of 2D motion feature sets, the plurality of video sequences by minimizing the difference score.
11. The method of claim 10, wherein synchronizing the plurality of video sequences frame aligns the plurality of video sequences.
12. The method of claim 10, further comprising a trained machine learning (ML) model, and wherein the plurality of 2D motion feature sets are provided using the trained ML model.
13. The method of claim 10, wherein the plurality of 2D motion features include only respective vertical velocities in an image plane of each video frame included in the plurality of video sequences.
14. The method of claim 10, wherein each 2D motion feature corresponds respectively to one of a plurality of predetermined keypoints of the subject.
15. The method of claim 10, wherein the subject includes a skeleton.
16. The method of claim 15, wherein each 2D motion feature corresponds respectively to one of a plurality of predetermined keypoints of the subject, and the plurality of predetermined keypoints of the subject comprise joints of the skeleton.
17. The method of claim 10, wherein a location of each of the plurality of cameras is a 3D location.
18. The method of claim 17, wherein the 3D location of each of the plurality of cameras is unknown to the system.

* * * * *